United States Patent
Haverfield et al.

(10) Patent No.: US 6,602,174 B1
(45) Date of Patent: Aug. 5, 2003

(54) METHOD AND APPARATUS FOR SEALING A DRAWTAPE TO A HEM OF A THERMOPLASTIC FILM STRUCTURE

(75) Inventors: Gregory A. Haverfield, Roodhouse, IL (US); Gerald E. Rawlings, Waverly, IL (US); David A. Bryniarski, Pittsford, NY (US)

(73) Assignee: Pactiv Corporation, Lake Forest, IL (US)

( * ) Notice: Subject to any disclaimer, the term of this patent is extended or adjusted under 35 U.S.C. 154(b) by 0 days.

(21) Appl. No.: 09/551,377

(22) Filed: Apr. 18, 2000

(51) Int. Cl.[7] ................................................. B31B 1/64
(52) U.S. Cl. ........................ 493/191; 493/192; 493/225; 53/373.9
(58) Field of Search ............................ 383/75; 493/225, 493/264, 191, 192, 928, 381; 53/373.9

(56) References Cited

U.S. PATENT DOCUMENTS

| | | |
|---|---|---|
| 3,772,968 A | 11/1973 | Ruda |
| 3,953,272 A * | 4/1976 | Webber |
| 4,558,463 A | 12/1985 | Boyd |
| 4,601,694 A * | 7/1986 | Ausnit |
| 4,628,536 A | 12/1986 | Herrington |
| 4,664,649 A | 5/1987 | Johnson et al. |
| 4,714,454 A | 12/1987 | Herrington |
| 4,850,944 A | 7/1989 | Osborn |
| 4,854,983 A * | 8/1989 | Bryniarski et al. ........... 156/70 |
| 4,881,933 A | 11/1989 | Wech |
| 4,889,522 A | 12/1989 | Gletman, Jr. |
| 5,006,380 A | 4/1991 | Fraser |
| 5,024,642 A | 6/1991 | Buchman et al. |
| 5,797,828 A * | 8/1998 | Selle et al. |
| 5,816,019 A * | 10/1998 | Saget et al. |
| 5,857,953 A | 1/1999 | Selle et al. |
| 6,059,458 A * | 5/2000 | Belias et al. |

* cited by examiner

Primary Examiner—Eugene Kim
(74) Attorney, Agent, or Firm—Jenkens & Gilchrist

(57) ABSTRACT

A method and apparatus for sealing a drawtape to a hem of a thermoplastic film structure is disclosed. The thermoplastic film structure includes a panel, the hem, and the drawtape. The hem is formed along one end of the panel, and the drawtape is housed within the hem. In the method, the film structure is conveyed to a stationary heat sealer that includes a stationary heated block and a hot air blower spaced from the heated block. The film structure is momentarily stopped at the stationary heat sealer with hem disposed between the heated block and the hot air blower. While the film structure is stopped, the hot air blower blows heated air onto the hem to force the hem against the heated block, thereby sealing the drawtape to the hem.

23 Claims, 4 Drawing Sheets

METHOD AND APPARATUS FOR SEALING A DRAWTAPE TO A HEM OF A THERMOPLASTIC FILM STRUCTURE

FIELD OF THE INVENTION

The present invention relates generally to plastic bags and, more particularly, relates to a method and apparatus for sealing a drawtape to a hem of a thermoplastic film structure.

BACKGROUND OF THE INVENTION

Sealable polymeric packages, such as trash bags, are a common household item. The bags come to the consumer in the form of a roll of interconnected bags or as pre-separated bags housed in a dispensing box. When the bags are provided in the form of a roll, one end of the bag, the bottom, is thermally sealed closed and connected to its neighboring bag along a perforated line; the other end of the bag, the open mouth end, is attached to its neighboring bag solely along another perforated line. When the bags are pre-separated, neighboring bags are generally overlapped or interleaved in such a manner that removal of one bag from the dispensing box draws the neighboring bag toward an opening in the box.

In order to close a typical polymeric bag after it has been filled by the consumer, the bag body adjacent the open mouth end of the bag is gathered and tied into a knot or secured using a separate tie member supplied by the vendor of the bags. Tie members typically include paper coated flexible wires, rubber bands, or strips of plastic having a locking mechanism to provide a means to pull tight and securely fasten the neck of the bag. The need for separate tie members, however, adds an additional cost factor for the manufacturer, and ultimately, the consumer. In addition, separate tie members are easily lost and hence can be a nuisance for the consumer. Polymeric packages having integral closure systems overcome these problems. Such integral closure systems can be in the form of tie members, adhesives and the like.

One particularly advantageous closure system is a drawtape or drawstring that is integral to the bag body. Bags of this type are typically in the form of a pair of pliable thermoplastic body panels joined to each other along a pair of opposing sides and a bottom bridging the opposing sides. The bag may be opened along a mouth end formed opposite the bottom. The body panels form a hem along the mouth end of the bag, and the hem houses a pliable thermoplastic drawtape. One or more drawtape holes located within the hem expose the drawtape allowing it to be pulled through the holes to close the bag and to be used as a handle.

Examples of such drawtape bags are disclosed in U.S. Pat. Nos. 4,597,750, 4,624,654, and 4,854,983. In the manufacture of drawtape bags, the body panels and the hem are formed from a continuous sheet of thermoplastic film. The sheet is folded in half to form the opposing panels and the free ends of the respective panels are folded over to form respective hems. Drawtapes are then inserted into the respective hems, and the hems are sealed to the respective panels to maintain the drawtapes within the respective hems. Next, the ends of each drawtape are presealed to the respective hem at the areas where the side seals of the bags are to be made to insure that the drawtapes will not pull loose from the side seals. In one presealing technique, the hem-carrying sheet is stopped and heated seal bars are pressed against the preseal area while the sheet is stopped. In another presealing technique, the hem-carrying sheet is continuously moved over a cylindrical drum having a heated seal bar mounted flush with its cylindrical surface. The sheet is pressed against the cylindrical surface by at least one rubber nip roll and is heat sealed in the area of the seal bar. Although such techniques typically generate adequate preseals, the present inventors have discovered a technique for generating preseals without moving parts, which improves speed efficiency, mechanical reliability, and process consistency.

SUMMARY OF THE INVENTION

These and other objects are realized by a method and apparatus for sealing a drawtape to a hem of a thermoplastic film structure. The thermoplastic film structure includes a panel, the hem, and the drawtape. The hem is formed along one end of the panel, and the drawtape is housed within the hem. In the method, the film structure is conveyed to a stationary heat sealer that includes a stationary heated block and a hot air blower spaced from the heated block. The film structure is momentarily stopped at the stationary heat sealer with hem disposed between the heated block and the hot air blower. While the film structure is stopped, the hot air blower blows heated air onto the hem to force the hem against the heated block, thereby sealing the drawtape to the hem.

The above summary of the present invention is not intended to represent each embodiment, or every aspect of the present invention. This is the purpose of the figures and detailed description which follow.

DESCRIPTION OF THE DRAWINGS

Other objects and advantages of the invention will become apparent upon reading the following detailed description and upon reference to the drawings in which.

Figure 1:
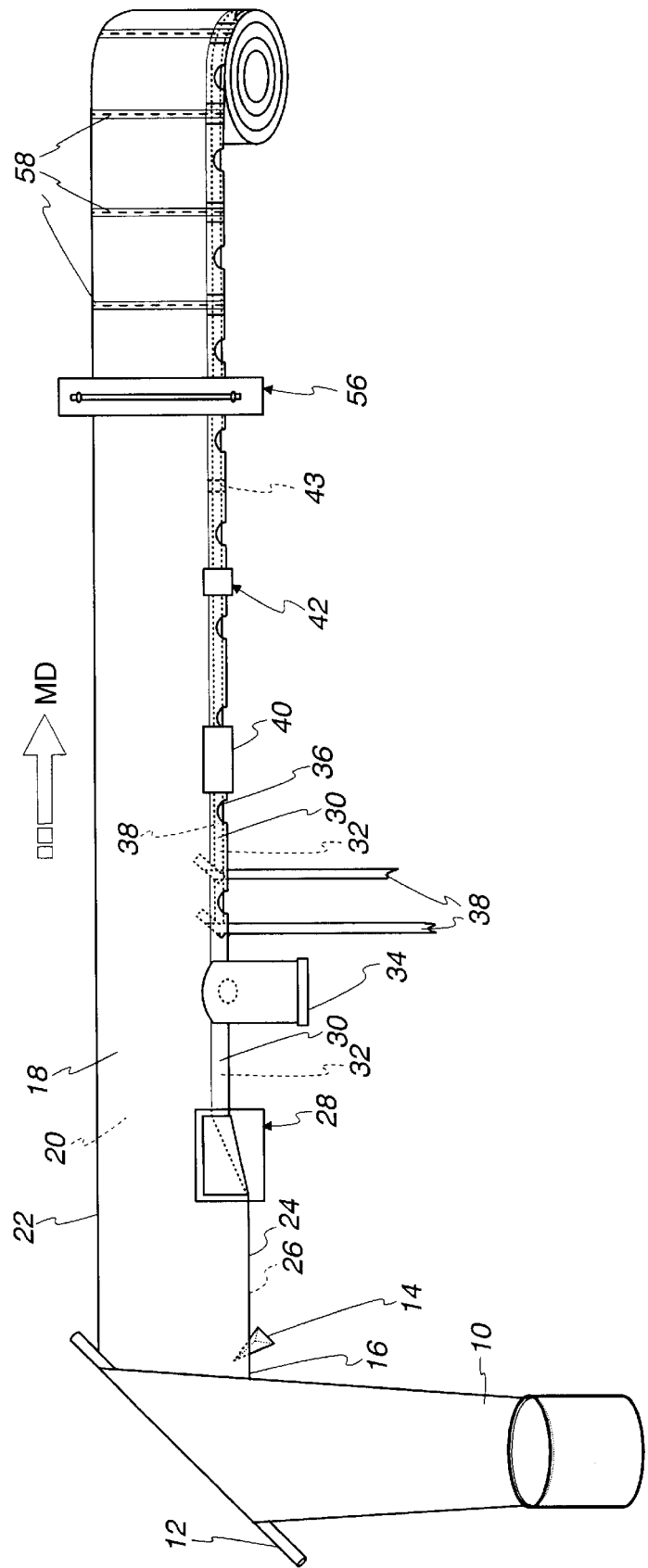
FIG. 1 is a schematic view of a method of manufacturing drawtape bags.

While the invention is susceptible to various modifications and alternative forms, a specific embodiment thereof has been shown by way of example in the drawings and will be described in detail. It should be understood, however, that it is not intended to limit the invention to the particular form described, but, on the contrary, the intention is to cover all modifications, equivalents, and alternatives falling within the spirit and scope of the invention as defined by the appended claims.

DESCRIPTION OF ILLUSTRATIVE EMBODIMENTS

Turning now to the drawings, FIG. 1 illustrates a method of making drawtape bags from a tube 10 of thermoplastic film. First, the tube 10 is extruded in a machine direction (MD), flattened by one or more rollers in a flattening mechanism 12, and then slit by a static slitting mechanism 14 along one side 16 to form what eventually becomes the open tops in the drawtape bags. The slit tube includes a pair of superposed pliable panels 18 and 20 joined to each other along a longitudinal fold 22 extending in the machine direction (MD). The fold 22 forms what eventually becomes the bottoms of the drawtape bags. The panels 18 and 20 include respective longitudinal free ends 24 and 26 opposite the longitudinal fold 22. Although FIG. 1 illustrates the flattened tube 10 as being fed directly to the slitting mechanism 14, the flattened tube 10 may alternatively be wound on a roll, placed in storage, and then unwound from the roll and fed to the slitting mechanism 14 at some later time when the tube is needed.

Second, the joined panels 18 and 20 are passed through a static folding mechanism 28, which inwardly folds the respective free ends 24 and 26 to form respective hems 30 and 32.

Third, a single-hole cutting mechanism 34 punches holes 36 in each hem at regular distance intervals corresponding to a desired width of the drawtape bags produced by the manufacturing method. The drawtape holes 36 in the hem 30 on the panel 18 coincide with the respective drawtape holes 36 in the hem 32 on the panel 20. The aligned pairs of drawtape holes are located at what eventually becomes the approximate centers of the open tops of the drawtape bags.

Fourth, a pliable thermoplastic drawtape 38 from a supply roll (not shown) is continuously fed and inserted into the hem on each panel. Thus, one drawtape is inserted into the hem 30 on the panel 18, while another drawtape is inserted into the hem 32 on the panel 20.

Fifth, a static heat sealing mechanism 40 seals the edges of the hems 30 and 32 to the respective panels 18 and 20 to confine the drawtapes within the respective hems 30 and 32.

Figure 2:
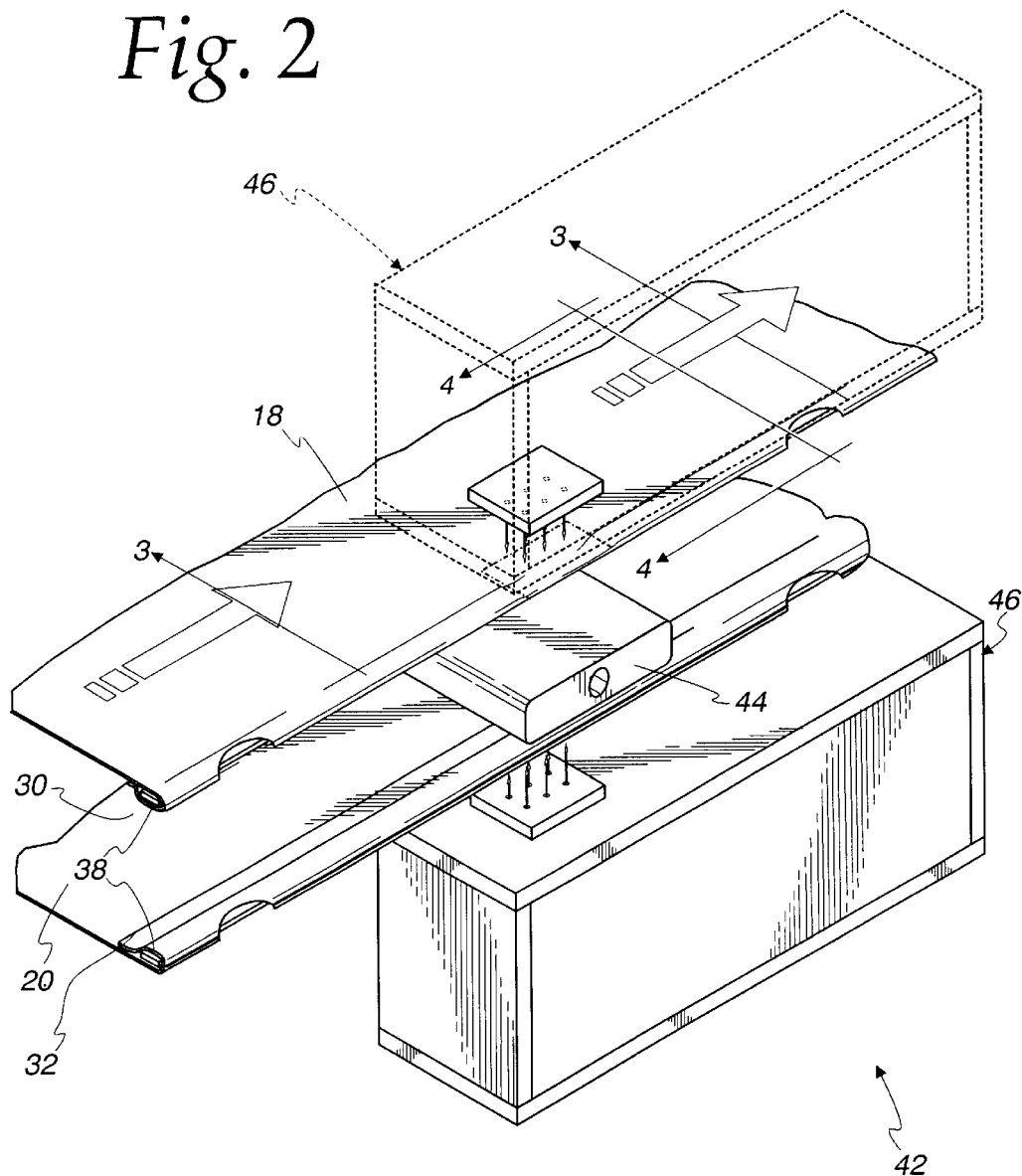
FIG. 2 is an isometric view of a stationary hot air sealer for presealing a drawtape to a hem of each drawtape bag.

Sixth, a stationary heat sealer 42 preseals the drawtapes to the respective hems 30 and 32 at the areas 43 where the side seals of the bags are to be made to insure that the drawtapes will not pull loose from the side seals. Referring to FIG. 2, the stationary heat sealer 42 includes a stationary heated block or bar 44 and a pair of hot air blowers 46. The heated block 44 is disposed between and spaced from the pair of hot air blowers 46. The hem 30 is disposed between the heated block 44 and one of the hot air blowers 46, and the hem 32 is disposed between the heated block 44 and the other of the hot air blowers 46. To preseal the drawtapes to the respective hems 30 and 32, the joined panels 18 and 20 are temporarily stopped. While the joined panels 18 and 20 are stopped, the hot air blowers 46 blow heated air on the respective hems 30 and 32 to force the hems against the heated block 44.

In one embodiment, the hot air blowers 46 continuously blow heated air on the respective hems 30 and 32, whether or not the panels 18 and 20 have stopped moving in the machine direction (MD). The heated air, however, only generates the preseals 43 while the panels are stopped based on the following thermal fusion factors: (1) temperature of the heated air, (2) temperature of the heated block 44, (3) pressure applied by the heated air on the hems, and (4) dwell time for which panels are stopped and the area 43 is subjected to presealing by the heat sealer 42. With respect to a dwell time of approximately 250 milliseconds, it has been found that the following groups of process settings create adequate preseals:

|  | Group 1 | Group 2 | Group 3 |
|---|---|---|---|
| Air Temperature (°F.) | 300 | 250 | 250 |
| Block Temperature (°F.) | 350 | 350 | 375 |
| Air Pressure (PSI) | 10 | 20 | 20 |

Figure 3:
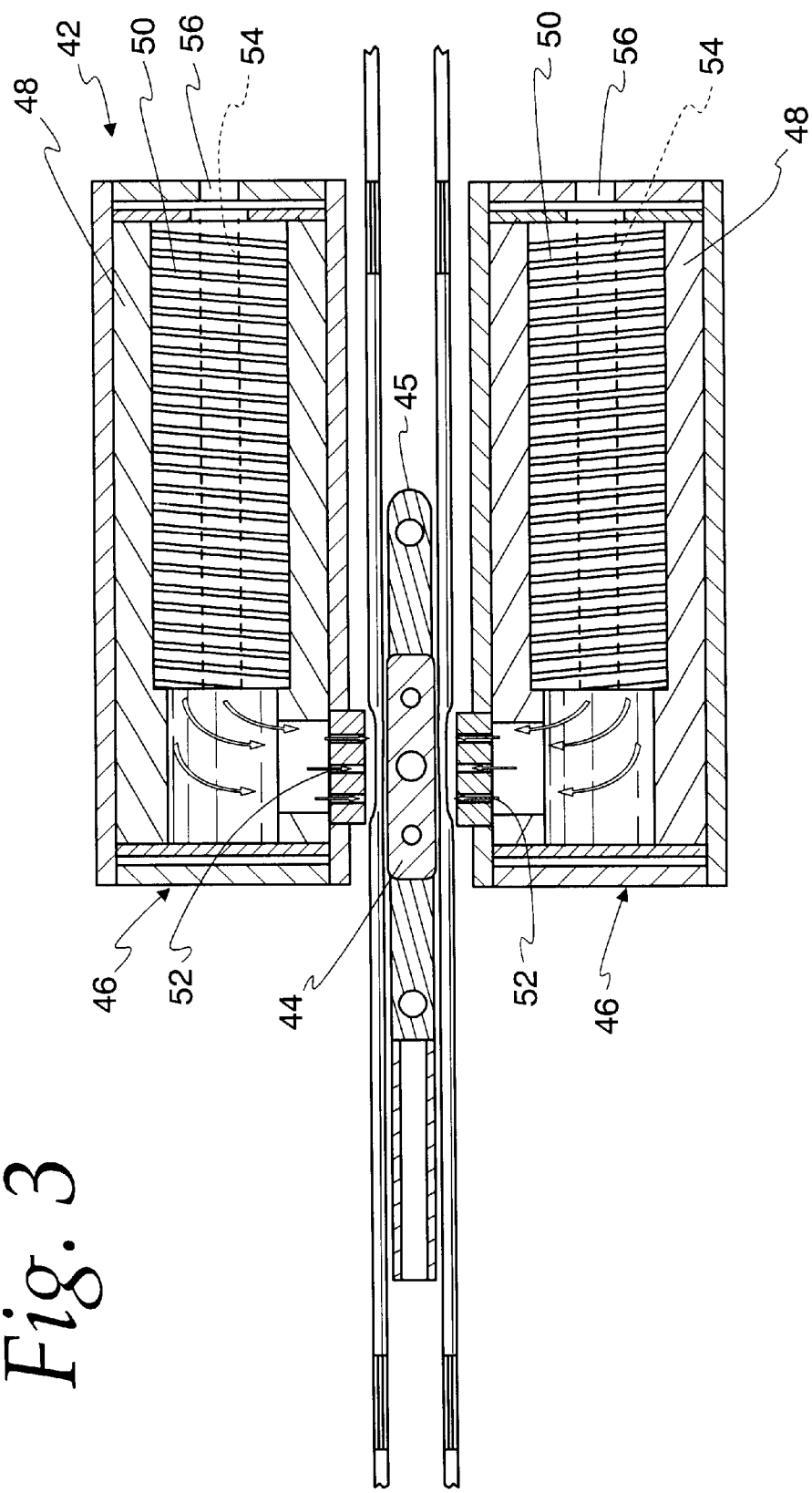
FIG. 3 is a sectional view taken generally along line 3—3 in FIG. 2.
Figure 4:
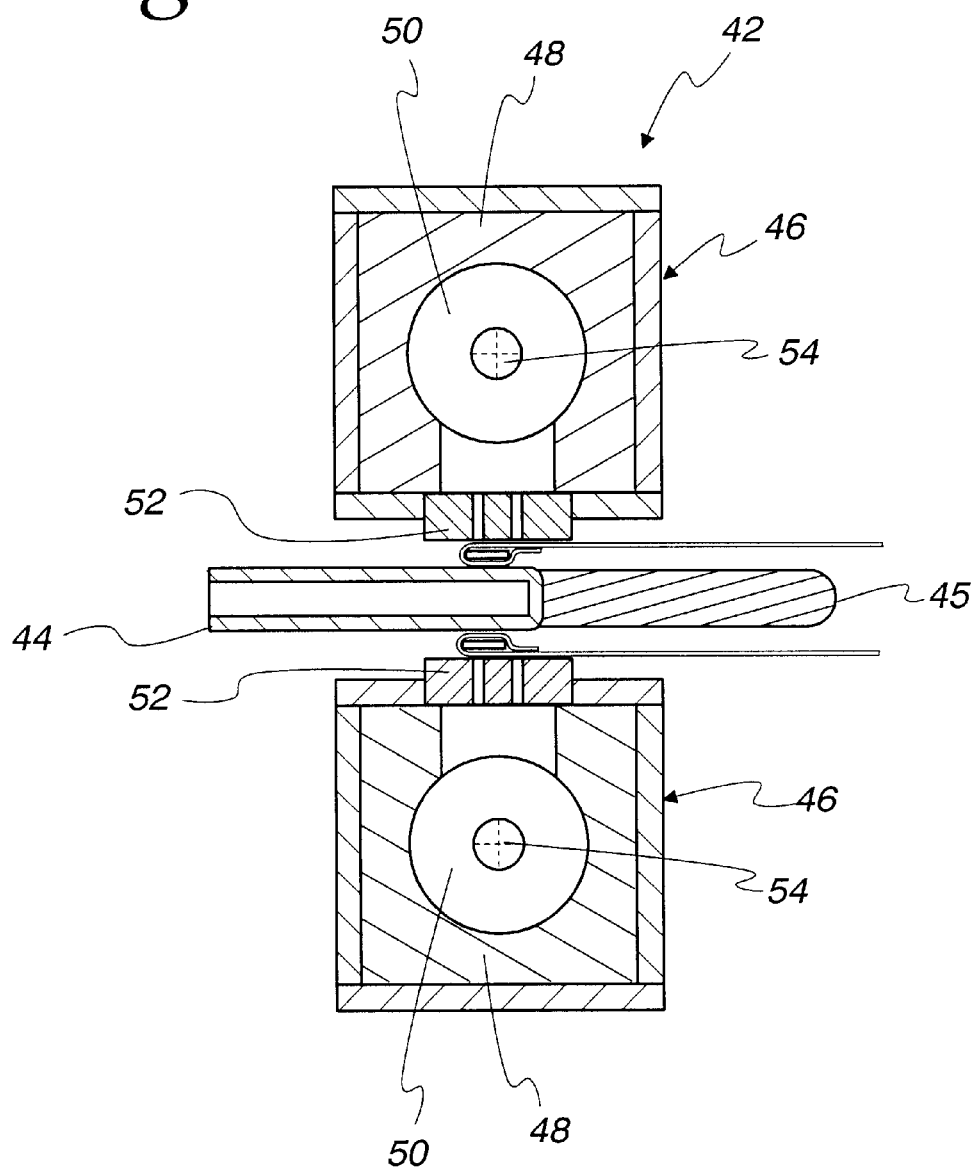
FIG. 4 is a sectional view taken generally along line 4—4 in FIG. 2.

FIGS. 3 and 4 illustrate some details of the heat sealer 42. Each hot air blower 46 includes a thermally insulated outer shell 48, a hollow inner core 50, and a nozzle plate 52. The hollow inner core 50 is generally cylindrical in shape, fits snugly within a cylindrical bore in the outer shell 48, and contains a heating element 54 along its central axis. A close spiral groove is machined in an outer surface of the inner core 50. To operate the hot air blower 46, compressed air at room temperature is introduced at one end 56 of the inner core 50. The heating element 54 heats the compressed air as it travels through the inner core 50. The effective path length of the compressed air is increased by traveling through the spiral groove in the outer surface of the inner core 50. The nozzle plate 52 redirects the heated air toward the respective hem 30 or 32 after the air has exited the spiral groove.

The stationary heat sealer 42 preferably includes a cooling plate 45 adjacent to the heated block 44. An upper portion of the panel 18 adjacent to the respective hem 30 is proximate the cooling plate 45 while the hem 30 is disposed between the heated block 44 and the respective hot air blower 46. Similarly, an upper portion of the panel 20 adjacent to the respective hem 32 is proximate the cooling plate 45 while the hem 32 is disposed between the heated block 44 and the respective hot air blower 46.

Returning to FIG. 1, after presealing the drawtapes to the hems, a heat sealing and perforation mechanism 56 generates side seal structures 58 transverse to the machine direction (MD) and disposed at regular distance intervals corresponding to the predetermined width of the drawtape bags produced by the manufacturing method. Each side seal structure 58 includes a perforation line disposed between a pair of spaced seal lines. The perforation line allows the sheets to be separated into the individual drawtape bags. The bags may then be packaged in a dispensing box for sale to consumers.

With respect to a prototypical drawtape bag made by the manufacturing method described above, the tube 10 may be composed of a wide range of polymeric materials such as linear low density polyethylene (LLDPE), low density polyethylene (LDPE), high pressure polyethylene (HPPE), high molecular weight high density polyethylene (HDPE), polyester, polystyrene, or blends of these polymers. In addition, the tube may be composed of coextruded films uniting two or more of the above polymers. Each panel of the tube preferably has a thickness ranging from about 0.4 mil to about 2 mils.

The drawtape 38 is composed of a polymeric material having a high yield strength and low elasticity in the draw direction. These properties mean that when the drawtape 38 is subjected to high stresses in the draw direction, the drawtape 38 substantially maintains its shape and does not stretch from its original length. When some prior art drawtapes are pulled hard to close the bag, the drawtape elongates over most of its length and the area where it is gripped by the hand becomes narrow, or "ropes," and hurts the hand. The polymeric material of the drawtape 38 minimizes this "roping" effect. Suitable polymers include, but are not limited to, high molecular weight high density polyethylene, medium density polyethylene (MDPE), linear low density polyethylene, and low density polyethylene. The drawtape 38 preferably has a thickness ranging from about 1 mil to about 5 mils, where a thicker drawtape is desired for bags intended to carry heavier loads.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of sealing a drawtape to a hem of a thermoplastic film structure, comprising:

providing the thermoplastic film structure with a panel, the hem, and the drawtape, the hem being formed along one end of the panel, the drawtape being housed within the hem;

conveying the film structure to a stationary heat sealer, the stationary heat sealer including a stationary heated block and a hot air blower spaced from the heated block, the hem being disposed between the heated block and the hot air blower;

momentarily stopping the film structure at the stationary heat sealer; and while the film structure is stopped, blowing heated air from the hot air blower onto the hem to force the hem against the heated block, thereby sealing the drawtape to the hem.

2. The method of claim 1, wherein the hot air blower also blows heated air while the film structure is not stopped.

3. The method of claim 1, wherein the film structure is momentarily stopped at the stationary heat sealer for a time period of less than about one second.

4. The method of claim 1, wherein the stationary heat sealer further includes a cooling plate adjacent to the heated block, and wherein a portion of the film structure adjacent to the hem is proximate the cooling plate while the hem is disposed between the heated block and the hot air blower.

5. The method of claim 1, wherein the hot air blower blows heated air at a pressure of at least about 10 pounds per square inch (PSI).

6. The method of claim 1, wherein the heated block has a temperature of at least about 200 degrees Fahrenheit.

7. The method of claim 1, wherein the hot air blower blows heated air having a temperature of at least about 200 degrees Fahrenheit.

8. A method of sealing a drawtape to a hem of a thermoplastic film structure, comprising:

providing the thermoplastic film structure, the film structure including pair of opposing panels joined along a fold, the panels including respective hems disposed opposite the fold, the film structure including drawtapes housed within the respective hems;

conveying the film structure to a stationary heat sealer, the stationary heat sealer including a stationary heated block and a pair of hot air blowers, the heated block being disposed between and spaced from the pair of hot air blowers, one of the hems being disposed between the heated block and one of the hot air blowers, the other of the hems being disposed between the heated block and the other of the hot air blowers;

momentarily stopping the film structure at the stationary heat sealer; and while the film structure is stopped, blowing heated air from the hot air blowers onto the respective hems to force the hems against the heated block, thereby sealing the drawtapes to the respective hems.

9. The method of claim 8, further including sealing the panels to each other along side seal structures generally transverse to the fold to create individual drawtape bags, the side seal structures being spaced at regular distance intervals corresponding to a desired width of the drawtape bags.

10. The method of claim 8, wherein the step of providing the thermoplastic film structure includes extruding a tube of thermoplastic film, flattening the tube, and slitting the flattened tube along one side opposite the fold to provide free ends.

11. The method of claim 10, wherein the step of providing the thermoplastic film structure includes folding over the free ends to form the respective hems.

12. The method of claim 11, wherein the step of providing the thermoplastic film structure includes inserting the drawtapes into the respective hems.

13. The method of claim 8, wherein the hot air blowers also blow heated air while the film structure is not stopped.

14. The method of claim 8, wherein the film structure is momentarily stopped at the stationary heat sealer for a time period of less than about one second.

15. The method of claim 8, wherein the stationary heat sealer further includes a cooling plate adjacent to the heated block, and wherein portions of the film structure adjacent to the respective hems are proximate the cooling plate while the hems are disposed between the heated block and the respective hot air blowers.

16. The method of claim 8, wherein the hot air blowers blow heated air at a pressure of at least about 10 pounds per square inch (PSI).

17. The method of claim 8, wherein the heated block has a temperature of at least about 200 degrees Fahrenheit.

18. The method of claim 8, wherein the hot air blowers blow heated air having a temperature of at least about 200 degrees Fahrenheit.

19. An apparatus for sealing a drawtape to a hem of a thermoplastic film structure, the film structure including a panel, the hem, and the drawtape, the hem being formed along one end of the panel, the drawtape being housed within the hem, the apparatus comprising:

a stationary heated block; and a hot air blower spaced from the heated block by a distance sufficient to accommodate the hem between the hot air blower and the heated block, the hot hair blower being adapted to blow heated air onto the hem to force the hem against the heated block while the hem is momentarily stopped beneath the hot air blower, thereby sealing the drawtape to the hem.

20. The apparatus of claim 19, wherein the hot air blower blows heated air at a pressure of at least about 10 pounds per square inch (PSI).

21. The apparatus of claim 19, wherein the heated block has a temperature of at least about 200 degrees Fahrenheit.

22. The apparatus of claim 19, wherein the hot air blower blows heated air having a temperature of at least about 200 degrees Fahrenheit.

23. The apparatus of claim 19, further including a cooling plate adjacent to the heated block, a portion of the film structure adjacent to the hem being proximate the cooling plate while the hem is disposed between the heated block and the hot air blower.

* * * * *